United States Patent [19]
Littlejohn et al.

[11] Patent Number: 5,033,000
[45] Date of Patent: Jul. 16, 1991

[54] VARIABLE KEYED POWER DISTRIBUTION AND CONTROL SYSTEM FOR MOTORIZED WHEELCHAIR

[75] Inventors: Douglas J. Littlejohn, Sunnyvale; Havard L. Staggs, Mountain View; Baxter R. Watkins, Foster City, all of Calif.

[73] Assignee: Natco Corporation, Foster City, Calif.

[21] Appl. No.: 204,455

[22] Filed: Jun. 9, 1988

[51] Int. Cl.$^5$ .......................... G06F 7/04; B60R 25/00
[52] U.S. Cl. .................... 364/424.05; 364/424.01; 180/287; 180/907; 180/272
[58] Field of Search ............... 364/424.01, 424.05, 364/413.02; 180/287, 907, 272, 252, 6.5

[56] References Cited

U.S. PATENT DOCUMENTS

| | | | |
|---|---|---|---|
| 4,059,786 | 11/1977 | Jones et al. | 180/907 |
| 4,119,164 | 10/1978 | Fogg Jr. et al. | 180/6.5 |
| 4,157,123 | 6/1979 | Rodaway | 180/907 |
| 4,204,255 | 5/1980 | Cremer | 364/424.05 |
| 4,207,959 | 6/1980 | Youdin et al. | 180/167 |
| 4,387,325 | 6/1983 | Klimo | 318/71 |
| 4,421,336 | 12/1983 | Petrofsky et al. | 280/252 |
| 4,556,997 | 12/1985 | Takamiya et al. | 623/3 |
| 4,566,707 | 1/1986 | Nitzberg | 180/907 X |
| 4,634,941 | 1/1987 | Klimo | 318/139 |
| 4,672,375 | 6/1987 | Mochida et al. | 340/825.31 |
| 4,754,255 | 6/1988 | Sanders et al. | 340/64 |
| 4,811,013 | 3/1989 | Akutsu | 340/825.31 |

*Primary Examiner*—Thomas G. Black
*Attorney, Agent, or Firm*—Townsend and Townsend

[57] ABSTRACT

A motorized personal transport vehicle (PTV) with a removable, programmable memory which contains both a key code to enable only an authorized user to operate the PTV and contains constants for use in an algorithm which operates the PTV in accordance with a prescription for that particular user's needs. Control signals from an input, such as a joystick, are modified by the algorithm in accordance with the prescription for a particular user. This prescription is stored in the programmable memory and loaded into the computer when the memory is inserted. The key code in the memory can allow various levels of access, with access for a particular user, a particular group, physician access and technician access. In a preferred embodiment, an electrically erasable programamble read only memory (EEPROM) is used as the memory key. Two processors are used, a first control processor for operating the algorithm and controlling the PTV motors and a second command processor for controlling a display panel, receiving the inputs and modifying the inputs in accordance with a prescription. The modifications performed in the command processor are the filtering of the input signals and the control of acceleration and deceleration. A display has an icon in the shape of a wheelchair. The status of the PTV for its operating modes is indicated by different elements of the icon which light up to indicate a particular status. For instance, a pair of downward directed eyes indicate that the ultrasonic drop off sensors are active.

12 Claims, 5 Drawing Sheets

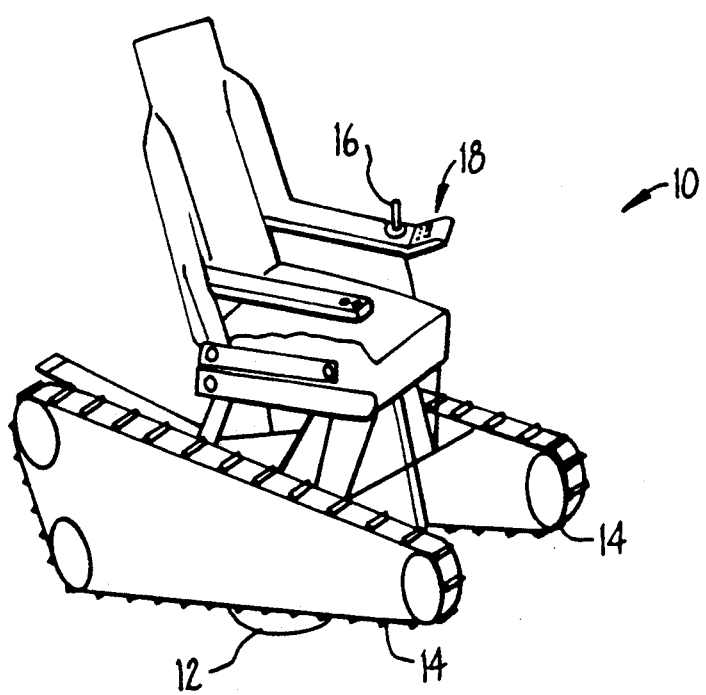
FIG._1.

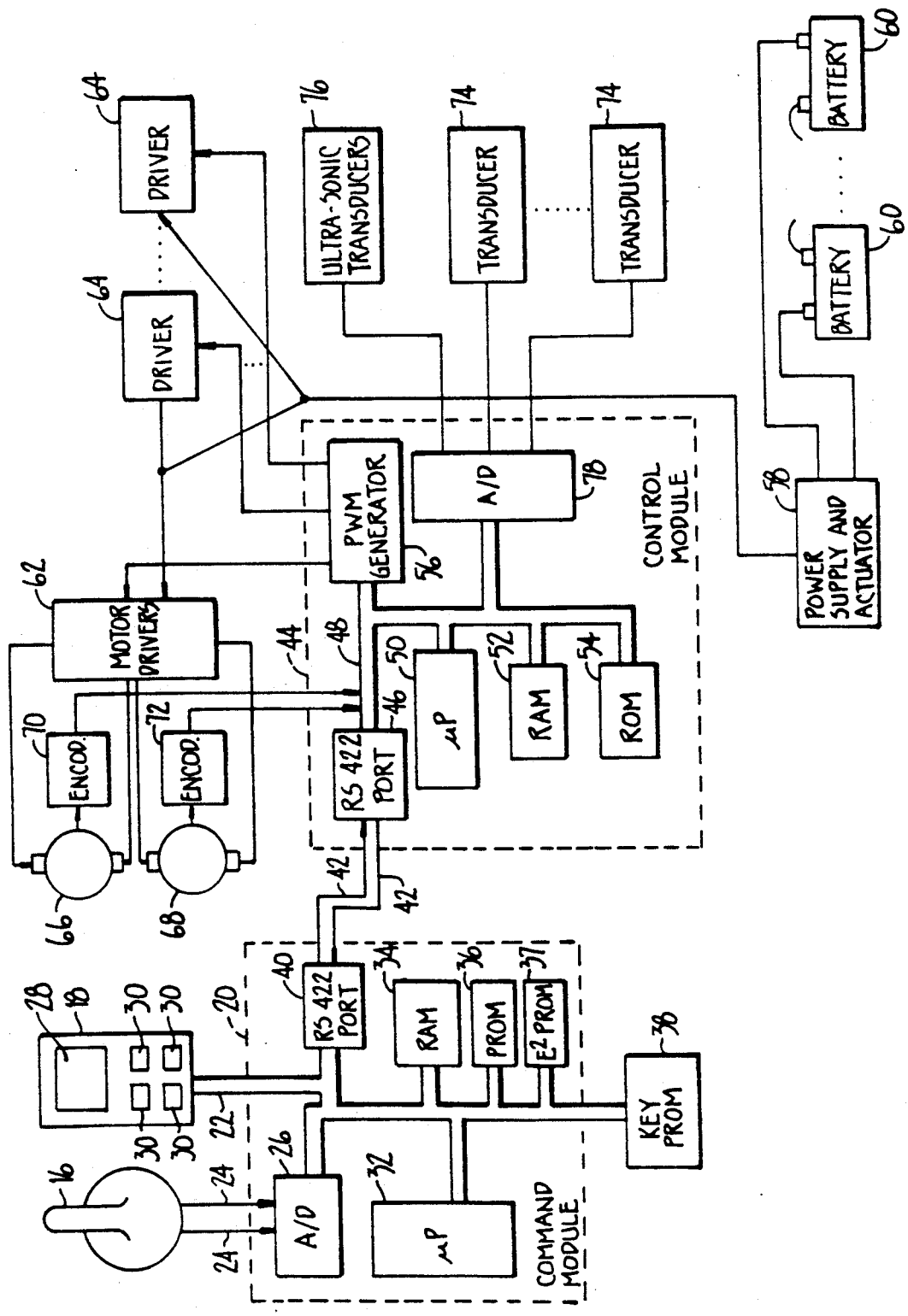
FIG._2.

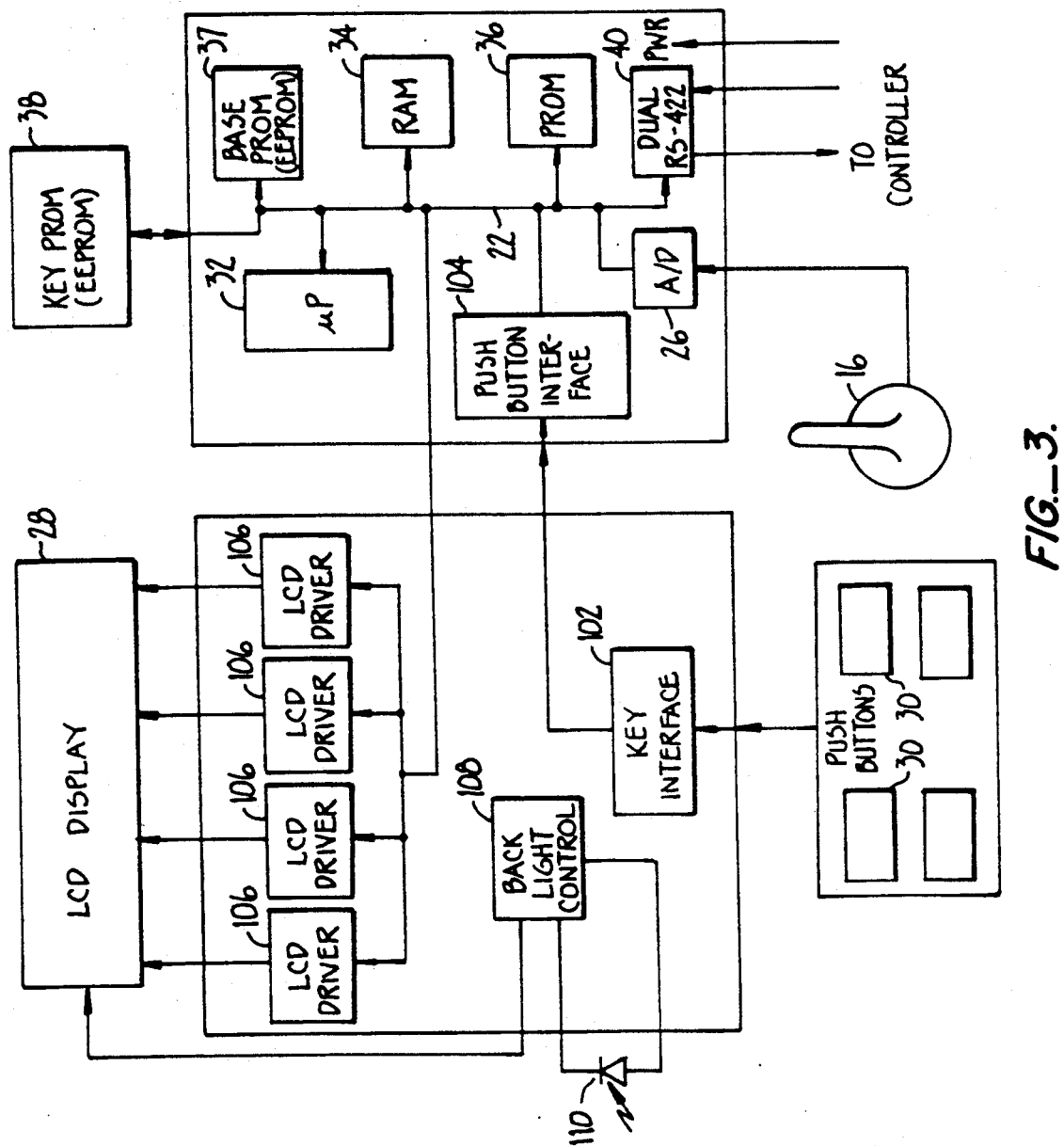
FIG._3.

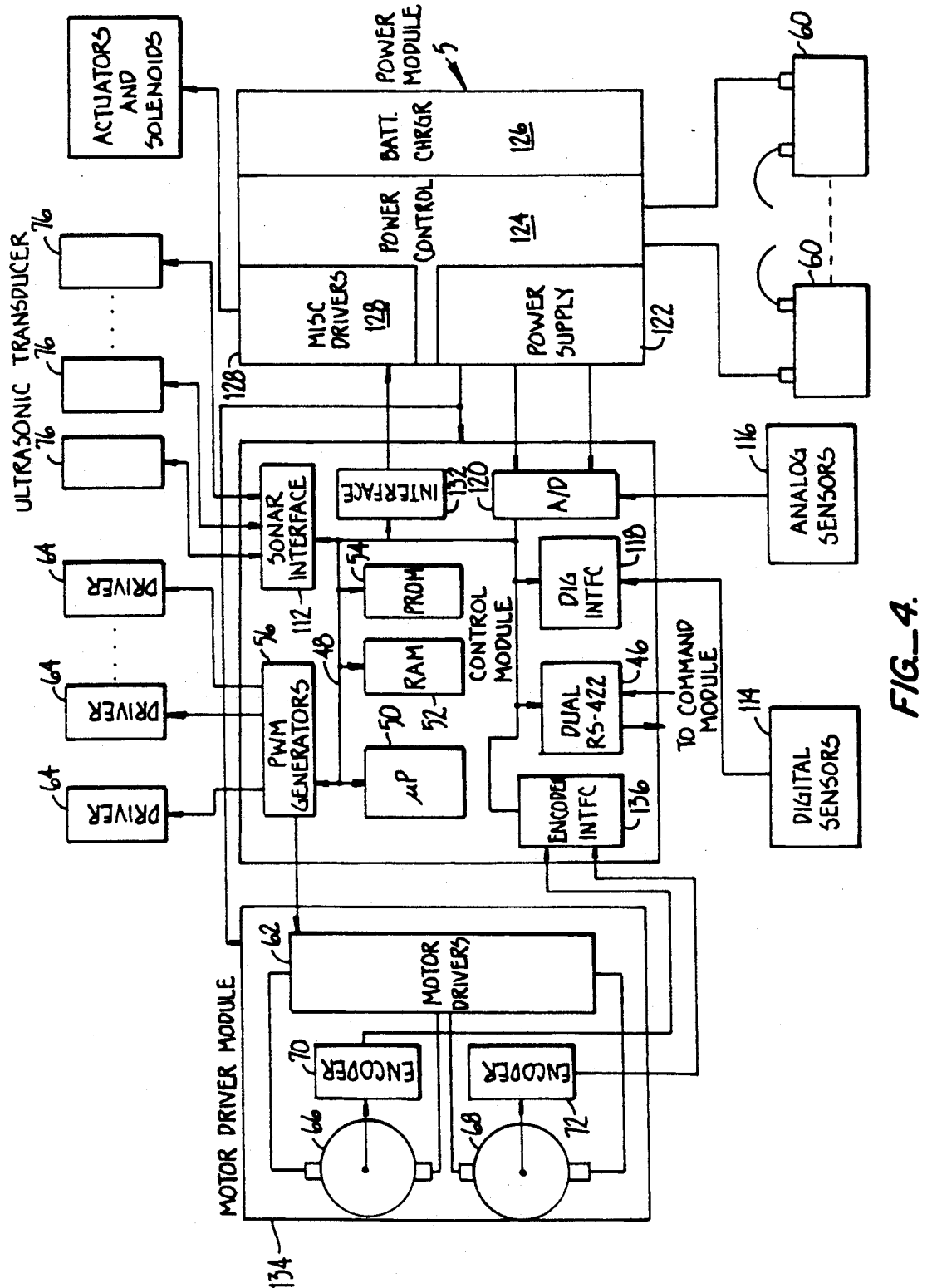
FIG._4.

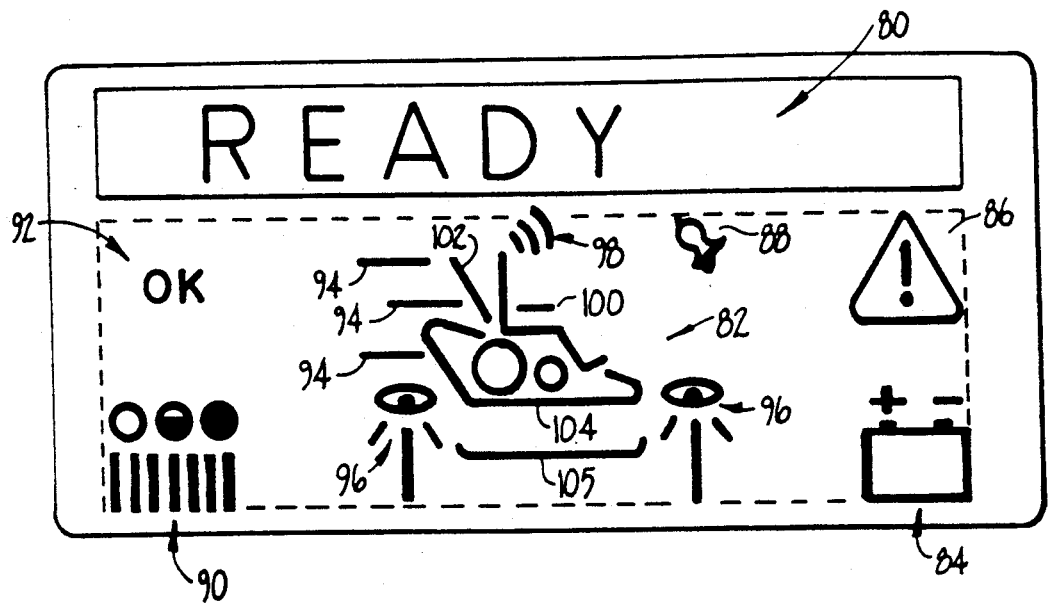
FIG._5.
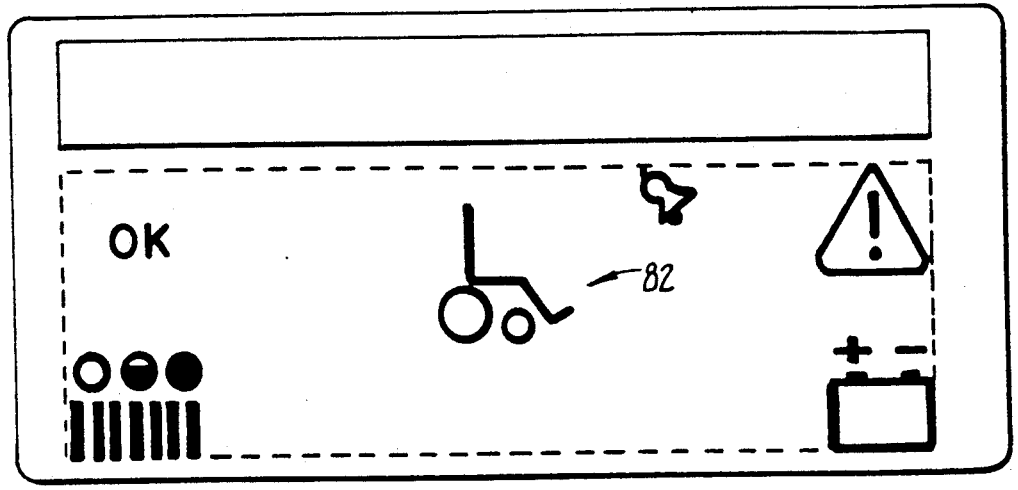
FIG._6.

VARIABLE KEYED POWER DISTRIBUTION AND CONTROL SYSTEM FOR MOTORIZED WHEELCHAIR

Appendix I sets forth a control algorithm and Appendix II describes a joystick filtering algorithm.

BACKGROUND

This invention relates to control systems for motorized wheelchairs or personal transport vehicles (PTV), and in particular to customizing mechanisms for such wheelchairs.

Motorized wheelchairs come in many different types, depending upon the abilities of the person expected to use the wheelchair. Some wheelchairs have stair climbing capabilities and other characteristics. A joystick is used as a typical input mechanism to control both the speed and direction of the wheelchair. However, some wheelchair users are unable to operate a joystick because of their disability. Other input mechanisms include voice control, head gear responsive to movements of the head, and an air pressure sensor responsive to blowing and sucking through a straw. Depending upon the type of input used, the input circuitry must be modified to handle input signals and provide the appropriate drive signals to the wheelchair motors in response.

In addition, even for a specific type of input, such as a joystick, there are variations among users. For instance, some users can operate a joystick only marginally since their hand may be constantly shaking. Thus, special filtering circuitry can be included to cancel out the affects of such shaking. In addition, a user may be able to only provide jerky movements, which would result in very rapid acceleration or deceleration unless modified. These modifications can be done by using different circuitry or providing switches as inputs to a processor in the back of the wheelchair which can be configured in accordance with a particular user's needs. Obviously, the use of such switches makes the circuitry complicated and requires a technician to configure the wheelchair for the particular user, adding to the costs. U.S. Pat. No. 4,634,941, for example, discloses in Col. 8 the use of variable resistances to control acceleration and deceleration.

Some wheelchairs are used in a multiple-user environment, such as a convalescent home, where the wheelchair must be reconfigured each time a new user is provided with the wheelchair. In addition, access to the wheelchair must be controlled where there is danger that a particular user may be injured in a wheelchair not adapted to that user's particular disabilities.

SUMMARY OF THE INVENTION

The present invention is a motorized personal transport vehicle (PTV) with a removable, programmable memory which contains both a key code to enable only an authorized user to operate the PTV and contains constants for use in an algorithm which operates the PTV in accordance with a prescription for that particular user's needs. Control signals from an input, such as a joystick, are modified by the algorithm in accordance with the prescription for a particular user. This prescription is stored in the programmable memory and loaded into the computer when the memory is inserted. The key code in the memory can allow various levels of access, with access for a particular user, a particular group, physician access and technician access.

In a preferred embodiment, an electrically erasable programmable read only memory (EEPROM) is used as the memory key. Two processors are used, a first control processor for operating the algorithm and controlling the PTV motors and a second command processor for controlling a display panel, receiving the inputs and modifying the inputs in accordance with a prescription. The modifications performed in the command processor are the filtering of the input signals and the control of acceleration and deceleration.

The present invention also uses a unique display with an icon in the shape of a wheelchair. The status of the PTV for its operating modes are indicated by different elements of the icon which light up to indicate a particular status. For instance, a pair of downward directed eyes indicate that the ultrasonic drop off sensors are active.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view of a motorized PTV utilizing the present invention;

FIG. 2 is a block diagram of the control electronics of the present invention;

FIG. 3 is a block diagram of the command module of FIG. 2;

FIG. 4 is a block diagram of the control module of FIG. 2; and

FIGS. 5 and 6 are diagrams of the visual display of the wheelchair of FIG. 1.

DETAILED DESCRIPTION OF THE PREFERRED EMBODIMENTS

FIG. 1 shows a wheelchair 10 which utilizes the present invention. One of motor driven wheels 12 is visible as are treads 14 which are used for stair climbing. A joystick 16 is mounted on one arm of the chair along with a control panel 18 having a display and push buttons. The joystick and control panel could be on separate arms.

Referring to FIG. 2, the control signals from joystick 16 and control panel 18 are provided to a command module 20. The signals from control panel 18 are provided on a address and data bus 22. The signals from joystick 16, which are generated by variable reluctance sensors, are analog signals provided on lines 24 to an analog-to-digital converter 26 in command module 20. A/D converter 26 is coupled to bus 22.

Control panel 18 has a display 28 and push buttons 30. The push buttons are preferably large and easily depressed, and display 28 uses large letters for easy viewing by the user.

The operation of the command module is controlled by a microprocessor 32 which uses a random access memory (RAM) 34 and a programmable read only memory (PROM) 36 and an EEPROM 37. A key PROM 38 is coupled to bus 22. Key PROM 38 provides a code to enable activation of the motorized wheelchair and also provides constants for an algorithm to process the input data and configure the wheelchair according to a prescription for a particular user, or group of users.

Joystick 16 could be replaced with other input devices, such as a straw which uses a suck and blow activation to produce changes in air pressure to air pressure sensors. These inputs would be similarly processed through A/D converter 26. Key PROM 38 would indicate the type of input used, and would provide the data needed by microprocessor 32 to accordingly modify the input data as appropriate for the type of input.

The key PROM contains a key password which is loaded into EEPROM 37 upon initialization of the wheelchair. Thereafter, that password is stored in EEPROM 37 and only a particular key PROM 38 having that password can activate the wheelchair. When the key PROM is inserted, microprocessor 32 compares the password with the password stored in EEPROM 37. Several different levels of key codes can be used, such as master (therapist and/or field service), group (clinical settings) and individual.

The key PROM is preferably electrically programmable (EEPROM) to allow changes to be made easily. A doctor can call the manufacturer with a new prescription and a new key PROM can be programmed and sent out. A new key PROM has a code indicating that it has not yet been used. When the contents of the new key PROM are loaded into EEPROM 37, the code in key PROM 38 is altered to indicate that it is a used key PROM. Thereafter, that key PROM can only be used to activate the particular wheelchair which has the same key password stored in its EEPROM. In addition, all of the constants from the key PROM are downloaded into the EEPROM in the command module, with the key PROM then providing a redundant backup.

The key PROM also contains constants needed to modify the control algorithm for the wheelchair in the areas of acceleration, deceleration, spasticity rejection, maximum speed (both translational and rotational) as well as general operating modes of the wheelchair.

Command module 20 includes a dual RS422 interface 40 coupled to a pair of serial links 42 to a control module 44. Two serial lines are provided to give full duplex communication with asynchronous, no hand shaking capability. Communications are received by an RS422 interface 46 in control module 44 and provided to an address and data bus 48. A microprocessor 50, RAM 52 and ROM 54 are coupled to bus 48. Control module 44 provides controlled power to various motors through a pulse width modulation (PWM) generator 56 coupled to drivers 62, 64. Power supply 58 provides power from a series of batteries 60 and also controls the charging of these batteries. The output of PWM generator 56 is connected to motor drivers 62 for the PTV wheels and to additional drivers 64 for other motors or solenoids for controlling the position of the seat, the tilt of the seat back, the raised or lowered position of the stair climbing track, etc.

Motor drivers 62 are coupled to right and left wheel motors 66 and 68. Encoders 70 and 72 provide feedback from motors 66 and 68 to microprocessor 50 through an interface (see FIG. 4).

A number of transducers 74 and ultrasonic transducers 76 are coupled to an analog-to-digital converter 78 in control module 44. In addition, control modules providing digital outputs may be used which may bypass A/D converter 78. These inputs can be multiplexed through a single A/D converter as shown in more detail in FIG. 4.

FIG. 3 shows command module 20 of FIG. 2 in more detail. In addition to the elements shown in FIG. 2, push-buttons 30 are coupled to microprocessor bus 22 via a key interface 102 and a second interface 104. A liquid crystal display (LCD) 28 is controlled by LCD drivers 106. Drivers 106 are in turn driven by microprocessor 32 with signals on bus 22. In addition a back light control circuit 108 controls a back light on LCD display 28 that shows it is active through an indicator light emitting diode (LED) 110.

FIG. 4 shows the controller module in more detail. Ultrasonic transducers 76 are coupled to microprocessor bus 48 through a sonar interface 112. Microprocessor 50 sends the signals through interface 112 to drive transducers 76, and then monitors the echo signals.

In addition to the ultrasonic transducers, both digital sensors 114 and analog sensors 116 are provided. The digital sensor signals are provided through a digital interface 118 to microprocessor bus 48. The analog sensor signals are provided through an analog-to-digital converter 120 to microprocessor bus 48. In addition, monitoring signals from a power supply 122 in power module 58 are provided through A/D converter 120.

Power module 58 includes power supply 122, power control circuitry 124, battery charger circuit 126 and miscellaneous drivers 128. Drivers 128 are connected to miscellaneous actuators and solenoids 130. Drivers 128 are activated by microprocessor 50 through an interface 132.

A motor driver module 134 contains the motor, driver and encoder elements shown in FIG. 2. In addition, the signals from encoder 70 and 72 are provided through an encoder interface 136 to microprocessor bus 48.

Appendix I shows one basic example of dual algorithms for controlling the wheel motors with $X_{LO}$ being the left motor power and $X_{RO}$ being the right motor power. These two algorithms use a modified proportion, integral, derivative (PID) algorithm with component calculations and constants shown in Appendix I. Three constants are provided by key PROM 38. These are $K_t$, $K_r$, and $K_s$. In addition, the key PROM may provide the constants for other algorithms for controlling other aspects of the wheelchair through drivers 64 or other coefficients for the algorithm. It should be noted that constants $K_t$ and $K_r$ are applied to the filtering algorithm for command module 20 which is described in more detail in Appendix II.

The filtering algorithm of Appendix II is performed in command module 20. Basically, this provides deadbands near the center position of the joystick and along the X and Y axes so that the user can go in a straight line without holding the joystick exactly straight and can stay in one position despite modest movements of the joystick. In addition, the algorithm provides increased response sensitivity at slower speeds and decreased sensitivity at higher speeds to get the user more maneuverability at the lower speeds and prevent sharp turns at higher speeds. Finally, spasticity filtering is done.

Key PROM 38 provides various constants for both the filtering algorithm in command module 20 and the control algorithm in control module 44, as well as other inputs to enable certain functions or set certain limits. Examples of these inputs are as follows:

1. Maximum angle the user is allowed to negotiate (9°–36°).
2. Maximum speed the user is allowed.
3. Reminder date of user's next appointment with the therapist for display on display 28.
4. Ability to enter the track mode for operating the wheelchair treads.

5. Ability to enter the stair climbing mode.

6. Ability to turn off the speech input mode (severely handicapped people may not want anyone to inadvertently switch off the speech).

7. Ability to set tilt and elevation of a chair (certain users should not be allowed to alter this).

8. Ability to turn off the ultrasonic drop-off detectors (this may be desirable for loading the wheelchair into a van, etc.).

9. Range (in miles and/or time) after which the chair will automatically go into a second level of functions, all of which are similarly programmable. This is provided so that the user does not necessarily have to go to the therapist to gain accessibility to higher functions when the user is expected to make certain progress in a certain time.

FIG. 5 shows the unique display of the present invention which includes a word display 80 and wheelchair icon 82. Also shown is a low battery indicator 84, a caution symbol 86, a bell indicator 88, a fuel level indicator 90 and a status indicator 92.

Wheelchair icon 82 has several elements which light up to indicate various status conditions. The basic wheelchair icon without any of the status indicators lit up is shown in FIG. 6. The various elements shown in FIG. 5 are as follows. First, a high-speed mode is indicated by lines 94. The activation of the ultrasonic sensors is indicated by eyes and downward directed lines 96. The activation of the voice synthesizer is indicated by lines 98. A line 100 indicates that the seat is elevated and a line 102 indicates that the seat back is tilted backward. A line 104 indicates that the stair climbing track is activated. Line 105 indicates that an "easy down", which cushions downward movements on stairs, is down and in position. Such an "easy down" is shown in U.S. Pat. No. 4,671,369.

As will be understood by those familiar with the art, the present invention may be embodied in other specific forms without departing from the spirit or essential characteristics thereof. For example, a different control algorithm than the one set forth could be used. Alternately, a straw-type suck and blow pressure sensor can be used instead of joystick 16. Accordingly, the disclosure of the preferred embodiment of the invention is intended to be illustrative, but not limiting, of the scope of the invention which is set forth in the following claims.

---

PTV Control Algorithm Definition      5/12/88, J. Golini

Let:

$N =$ Number of previous terms in integral. Allowable range (0,9).

$J_{Tj} =$ Joystick translational value for period j, where $j = 0, -N$. Allowable range $(-128, 127)$.

$J_{Rj} =$ Joystick rotational value for period j, where $j = 0, -N$. Allowable range $(-128, 127)$.

$C_{Lj} =$ Left motor encoder counts for period j, where $j = 0, -N$. Allowable range $(-255, 255)$.

$C_{Rj} =$ Right motor encoder counts for period j, where $j = 0, -N$. Allowable range $(-255, 255)$.

$K_t =$ Translational joystick conversion constant. Allowable range (0,1.5).

$K_r =$ Rotational joystick conversion constant. Allowable range (0,.5).

$K_s =$ PWM conversion constant. Allowable range (0,1.5).

$K_p =$ Proportional error constant. Allowable range $(-3,3)$.

$K_i =$ Integral error constant. Allowable range $(-3,3)$.

$K_d =$ Derivative error constant. Allowable range $(-10,10)$.

$K_m =$ Motor/motor error constant. Allowable range $(-10,10)$.

$X_{L-1} =$ Previous left motor power $(-255, 255)$.

$X_{R-1} =$ Previous right motor power $(-255, 255)$.

Then:

| | | |
|---|---|---|
| $T_j =$ | $K_t J_{Tj}, j = 0, -N$ | Modified joystick translational values. |
| $R_j =$ | $K_r J_{Rj}, j = 0, -N$ | Modified joystick rotational values. |
| $E_{Lj} =$ | $T_j - R_j - C_{Lj}, j = 0, -N$ | Left motor observed errors. |
| $E_{Rj} =$ | $T_j + R_j - C_{Rj}, j = 0, -N$ | Right motor observed errors. |
| $P_L =$ | $K_p E_{LO}$ | Left motor proportional correction. |
| $P_R =$ | $K_p E_{RO}$ | Right motor proportional correction. |
| $I_L =$ | $K_i \text{sum}(E_{Lj}, j = 0, -N)$ | Left motor integral correction. |
| $I_R =$ | $K_i \text{sum}(E_{Rj}, j = 0, -N)$ | Right motor integral correction. |
| $D_L =$ | $K_d(C_{LO} - C_{L-1})$ | Left motor derivative correction. |
| $D_R =$ | $K_d(C_{RO} - C_{R-1})$ | Right motor derivative correction. |
| $M_L =$ | $K_m(E_{RO} - E_{LO})$ | Left motor/motor correction. |
| $M_R =$ | $K_m(E_{LO} - E_{RO})$ | Right motor/motor correction. |
| $X_{LO} =$ | $X_{L-1} + K_s(P_L + I_L + D_L + M_L)$ | New left motor power. |
| $X_{RO} =$ | $X_{R-1} + K_s(P_R + I_R + D_R + M_R)$ | New right motor power. |

$X_{LO}$ and $X_{RO}$ are then bounded at $(-255, +255)$.

---

APPENDIX II

JOYSTICK FILTERING ALGORITHMS

SCOPE:

This Appendix describes the algorithms that are used to filter the joystick reading that are read off the analog to digital converters in the command module. The filtered readings are sent to the control module for implementation.

ALGORITHM:

NOTE:

Positive X direction is the direction of joystick straight forward.

Positive Y direction is the direction of joystick to extreme left.

1. ADDING SIGN $Xa + j\, Ya$ values read from the A/D converters are converted to $Xs + j\, Ys$ by converting the unsigned numbers (from 0 to 255) to signed numbers (from $-128$ to $+127$). Negative numbers are always represented in 2's complement form. The conversion is done by complementing the MSB of the numbers.

2. ADDING HYSTERESIS

The $Xs+jYs$ are converted to $Xsh+jYsh$ by the following method:

If the MSB of the signed number is 1 then set carry else reset it. Shift the number right one bit through carry.

This adds a negligible amount of hysteresis and converts the number range from ($-128$ to $+127$) to ($-64$ to $+63$).

3. FILTERING FOR TREMOR COMPONENTS

The $Xsh+jYsh$ after the above processes must then be sieved by a nth order real time digital low pass filter. The cut-off frequency of this filter (from about 1.5 Hz to 15 Hz) is stored in the Key PROM as a parameter. This kind of filter takes care of patients with involuntary tremor disability.

Xsh and Ysh have to be filtered separately, which should eliminate the tremor ac components in both the translational and rotational scalers and lead to desired results.

The resulting X and Y values are termed $Xf+jYf$.

4. NON-LINEAR MAPPING TO GET FINER LOW SPEED CONTROL AND DEAD BANDS

The $Xf+jYf$ are now mapped through either a table or another algorithm to produce $Xfm+jYfm$ that does the following things:

a. Small deflections of the joystick cause comparatively still smaller deviations in the $Xfm+jYfm$ values thereby increasing the resolution of the system in the regions close to the null position of the joystick.

Large deflections of the joystick cause comparatively still larger deviations in the $Xfm+jYfm$ values thereby decreasing the resolution of the system in the regions far away from the null position of the joystick.

This kind of mapping would enable the user to get finer control over the wheelchair's velocity when moving very slowly, say in the office area, where the user needs precision positioning.

A typical mapping may be obtained from the following equations:

$$Xfm = Rfm*\cos(theta\_fm)$$

$$Yfm = Rfm*\sin(theta\_fm)$$

where $$Rfm = 89 - 45*\log(89 - Rf)$$

$$theta\_fm = theta\_f$$

where $$Rf = sqrt(Xf*Xf + Yf*Yf)$$

$$theta\_f = \arctan(Yf/Xf)$$

One method to achieve this in software without computing log is to use look-up tables but that needs a large amount of memory. A preferred method is to use lesser resolution on the joystick and then use tables which will then be smaller.

Still another method is to do a divide of X and Y values. Divide the larger of the two by the smaller and then if the quotient is larger than a certain amount then only map X and Y separately through a linear log table.

One more method is to use tables only in one quadrant or even only in half a quadrant with some swappings and sign changes in the values of X and Y.

b. To the above tables or algorithm needs to be added a circular dead band around the null position of the joystick. Also a circular small full speed band around the circumference of the joystick circle would help in achieving uniform response from one chair to another. The straight forward band is automatically introduced by the mapping in a.

5. SCALING FOR MAXIMUM SPEEDS
(translational & rotational)

Please note that the High and Low speed mode is to be sensed by the control module and appropriate speeds calculated from the X and Y values sent by the command module. This method would enable higher precision in the Low speed mode by effectively treating the speed mode bit as another bit of joystick resolution.

Thus, for instance, a value of $(X, Y) = (+63, 0)$ received by the control means it will try to drive the chair at 3 mph if in the Low speed mode or 6 mph if in the High speed mode in the forward direction.

The scaling for maximum speed allowed may be done in either the command module or the control module.

6. CONTROLLING MAXIMUM ACCELERATIONS (translational & rotational)

The maximum accelerations are first of all going to be automatically limited by the location of the system's poles or in other words its sluggishness.

The following will limit the rate of change of X and Y separately:

If $$abs(Y(k) - Y(k-1)) > Aym$$

then $Yfmd = Y(k-1) + \pm Aym\{$sign of Aym same as sign of $(Y(k) - Y(k-1))\}$ else $$Yfmd = Y(k)$$

Do similarly for X using Axm and generate Xfmd

At higher translational speeds the value of Aym needs to lower whereas it can be higher at lower speeds. So the following step is also added to better the Y value only:

$Yfmd = Yfmd*Ktr/$Present translational speed

7. LOWERING REVERSE SPEEDS

Reverse speeds have to be much lower than forward speeds and this is done by multiplying the X and Y values obtained from the above processes by a constant if X is found to be negative. This constant is also stored in the key PROM.

Thus

If X is negative then $Xcur+jYcur = krev*(Xfmd+jYfmd)$ else $Xcur+jYcur = 1 * (Xfmd+jYfmd)$ where krev - reverse speed factor constant stored in key PROM. Typical values of krev could be between 0.1 and 0.25

(Xcur+j Ycur) are then the values transmitted to the Control Module.

We claim:

1. A single seat personal transport vehicle specifically designed for the handicapped or rehabilitating, such as a wheelchair, having wheels and at least one motor for driving the wheels, comprising:

user control input for producing drive signals;

controller means for enabling operation of said vehicle in response to a key code and driving said motor in accordance with said drive signals are modified by a predetermined algorithm; and a user detachable, programmable memory for physically attaching to said vehicle and providing said key code to said controller means and providing constants for said algorithm so that said vehicle can be configured according to a prescription for the physical capabilities of a particular user with said memory;

said controller means being operative to enable and control said vehicle only when presented with said constants in combination with said key code so that said vehicle can not be operated with a key code alone, thereby preventing operation of said vehicle by a user not capable of using said vehicle.

2. The vehicle of claim 1 wherein said programmable memory comprises an electrically erasable programmable read only memory (EEPROM).

3. The vehicle of claim 1 wherein said controller means includes an electrically erasable programmable read only memory (EEPROM) for storing said key code from said programmable memory, said controller means being programmed to compare a key code in said EEPROM with the key code provided by said detachable, programmable memory.

4. The vehicle of claim 1 wherein said controller is programmed to accept a plurality of key codes.

5. The vehicle of claim 1 wherein said algorithm includes spasticity filtering, acceleration and deceleration control, rotational speed control and stair-climbing control.

6. A personal transport vehicle having wheels and at least one motor for driving the wheels, comprising:

user control input for producing drive signals;

controller means for enabling operation of said vehicle in response to a key code and driving said motor in accordance with said drive signals as modified by a predetermined algorithm;

a detachable, programmable memory for providing said key code to said controller means and providing constants for said algorithm so that said vehicle can be configured for a particular user with said memory; and a display having an icon in the shape of a wheelchair with elements of said icon being displayed only when a portion of said vehicle represented by such element is activated.

7. A personal transport vehicle having wheels and a motor for driving the wheels, comprising:

a user control input for producing drive signals;

a first command controller for enabling operation of said vehicle in response to a key code and for filtering and modifying the acceleration of said drive signals to produce modified drive signals, said first command controller including a programmable read only memory (PROM) for storing said key code;

a second controller for applying a predetermined algorithm to said modified drive signals to produce power signals to drive said motor; and a detachable, programmable memory for providing said key code to said controller means and providing constants for said algorithm so that said vehicle can be configured for a particular user with said memory.

8. The vehicle of claim 7 wherein said PROM is electrically erasable (EEPROM).

9. A personal transport vehicle having wheels and at least one motor for driving the wheels, comprising:

user control input for producing drive signals;

controller means for enabling operation of said vehicle in response to a key code and driving said motor in accordance with said drive signals as modified by a predetermined algorithm, said controller means including a first command controller for filtering and modifying the acceleration of said drive signals to produce modified drive signals, and a second controller for applying said algorithm to said modified drive signals to produce power signals to drive said motor; and a detachable, programmable memory for providing said key code to said controller means and providing constants for said algorithm so that said vehicle can be configured for a particular user with said memory.

10. The vehicle of claim 9 further comprising:

a plurality of sensors;

an analog/digital converter coupled to said sensors;

a microprocessor coupled to said analog/digital converter; and driver circuitry coupled to said microprocessor for driving one or more motors in said vehicle under the control of said microprocessor in response to data or feedback from said sensors.

11. A personal transport vehicle for the handicapped or rehabilitating having wheels and at least one motor for driving the wheels, comprising:

a user control input for producing drive signals;

controller means for enabling operation of said vehicle in response to a key code and driving said motor in accordance with said drive signals as modified by a plurality of predetermined algorithms, including algorithms for spasticity filtering of said drive signals, acceleration and deceleration rate control rotational speed control and stair climbing control; and a detachable, programmable memory for physically attaching to said vehicle and providing said key code to said controller means and providing constants for said algorithm so that said vehicle can be configured according to a prescription for the physical capabilities of a particular user with said memory.

12. A wheelchair having wheels and at least one motor for driving the wheels, comprising:

a user control input for producing drive signals;

controller means for enabling operation of said wheelchair in response to a key code and driving said motor in accordance with said drive signals as modified by a predetermined algorithm;

a detachable key with a programmable memory for physically attaching to said wheelchair and providing said key code and an initialization code to said controller means and providing constants for said algorithm so that said wheelchair can be configured according to a prescription for the physical capabilities of a particular user with said memory; and means for modifying said initialization code in said key memory to a used code upon a first attachment of said key to said wheelchair and accepting any first key code, and thereafter enabling operation upon subsequent attachments of a key with a used code only in said key contains said first key code.

* * * * *